United States Patent [19]

Logan

[11] Patent Number: 4,877,279
[45] Date of Patent: Oct. 31, 1989

[54] STROKING FASCIA FOR VEHICLE ENERGY ABSORBING BUMPER SYSTEMS

[75] Inventor: James L. Logan, Lansing, Mich.
[73] Assignee: General Motors Corp., Detroit, Mich.
[21] Appl. No.: 92,762
[22] Filed: Sep. 3, 1987
[51] Int. Cl.⁴ ............................................. B60R 19/08
[52] U.S. Cl. .................................... 293/121; 293/120; 293/155
[58] Field of Search .............. 293/120, 121, 126, 132, 293/133, 134, 142, 149, 155, 117, 118, 154, 122; 267/139, 140

[56] References Cited

U.S. PATENT DOCUMENTS

| | | | |
|---|---|---|---|
| 3,700,273 | 10/1972 | Jackson et al. | 267/139 X |
| 3,734,554 | 5/1973 | Schwabenlender | 293/121 |
| 3,926,462 | 12/1975 | Burns et al. | 193/63 |
| 3,937,508 | 2/1976 | Glance et al. | 293/121 |
| 4,059,301 | 11/1977 | Meyer | 293/120 |
| 4,167,282 | 9/1979 | Matsuyama | 293/121 X |
| 4,252,355 | 2/1981 | Goupy et al. | 293/122 |
| 4,364,591 | 12/1982 | Bien | 293/120 X |
| 4,372,701 | 2/1983 | Watanabe | 293/121 X |
| 4,483,559 | 11/1984 | Lewis et al. | 293/155 X |
| 4,623,182 | 11/1986 | Trabert et al. | 293/155 |
| 4,671,551 | 6/1987 | Walsh et al. | 293/126 |
| 4,695,084 | 9/1987 | Hlavach | 293/126 |
| 4,700,977 | 10/1987 | Hlavach | 293/126 |
| 4,715,645 | 12/1987 | Lewis et al. | 293/155 X |
| 4,753,467 | 6/1988 | DeCaluwe et al. | 293/155 X |
| 4,765,665 | 8/1988 | Akahoshi | 293/155 X |

FOREIGN PATENT DOCUMENTS

| | | | |
|---|---|---|---|
| 0025556 | 3/1981 | European Pat. Off. | 293/120 |
| 3407985 | 10/1985 | Fed. Rep. of Germany | 293/155 |
| 0002238 | 1/1981 | Japan | 293/155 |
| 0209440 | 12/1982 | Japan | 293/155 |
| 0164246 | 9/1984 | Japan | 293/155 |
| 2062805 | 5/1981 | United Kingdom | 293/155 |

*Primary Examiner*—Douglas C. Butler
*Attorney, Agent, or Firm*—Charles R. White

[57] ABSTRACT

A front or rear bumper fascia for an automotive vehicle in which a series of channels and slots are formed across a support panel of the vehicle body work which allows the bumper fascia to stroke in a fore/aft direction when the bumper assembly is stroked during application of an impact load applied thereto.

2 Claims, 1 Drawing Sheet

U.S. Patent
Oct. 31, 1989
4,877,279
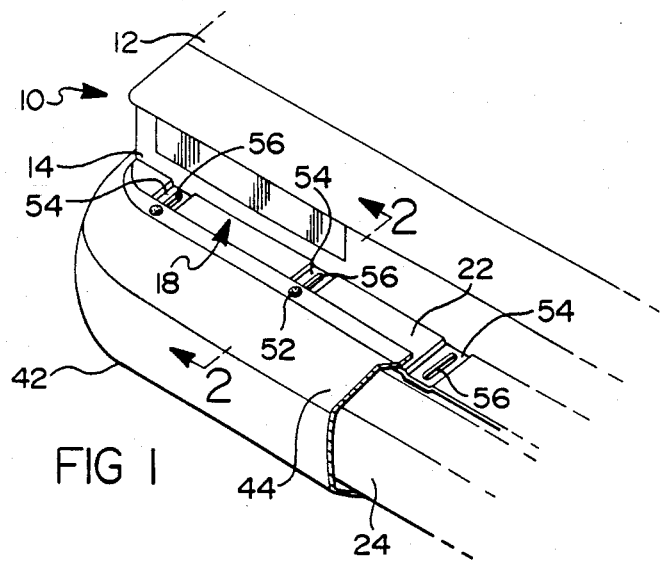
FIG 1
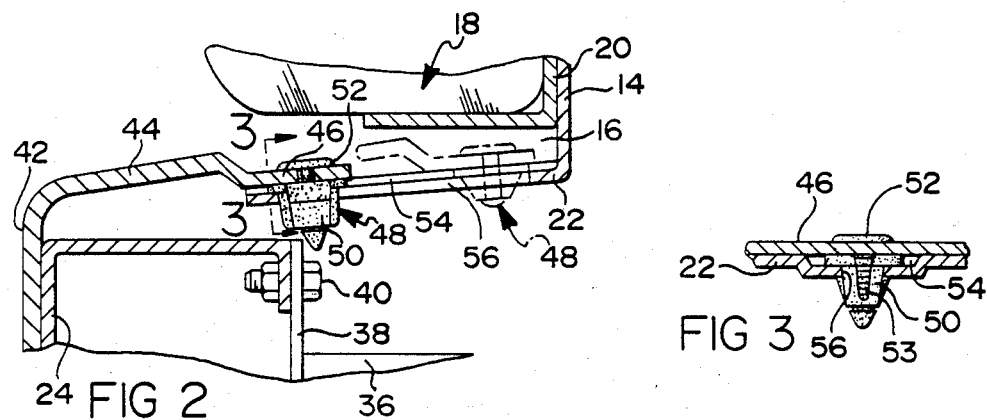
FIG 2
FIG 3
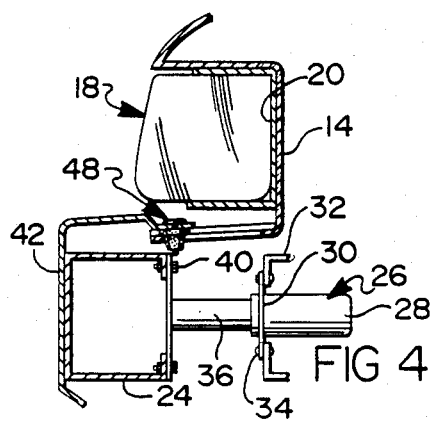
FIG 4
FIG 5

STROKING FASCIA FOR VEHICLE ENERGY ABSORBING BUMPER SYSTEMS

This invention relates to vehicle fascias and more particularly to a new and improved body work finishing fascia covering a stroking energy absorbing bumper system and fascia connection to vehicle body work by sliding attachments which strokes with the energy absorbing bumper without damage to the attachments and without appreciable bucking and resultant damage to lamps, grill work or vehicle body work.

Various fascia constructions have been utilized to cover the exterior of the front and rear energy absorbing bumpers of motor vehicles to provide a finished vehicle appearance and to deflect with the energy absorbers on application of low speed impact load so that there is no appreciable damage to the vehicle as a result of such impacts. An illustrative fascia construction is shown in U.S. Pat. No. 3,926,462 assigned to the assignee of this invention and hereby incorporated by reference.

The present invention is of this general type but provides a new attachment of the fascia to the body work of the vehicle, preferably through a series of channels and slots arranged across a suppport or end panel of the vehicle that form tracks for push in slide nuts and nut retainers. With this new and improved attachment, the bumper fascia can stroke in a longitudinal or fore/aft direction when the bumper system is stroked without damage to the fascia fasteners or components such as head lamps and grill work.

In the preferred embodiment of this invention, a fascia support panel that forms part of the vehicle body work is provided with a series of longitudinally extending channels laterally spaced across the length of the panel. A longitudinally extending slot is centered in each of these channels for the reception of "snap in" nuts that are retained therein for sliding or tracking in a longitudinal direction. The bumper fascia of suitable plastics material such as a RIM processed elastomeric urethane is positioned on the top of the support panel and the "snap in" nuts. This fascia is attached to the nuts and the support panel by a series of headed plastic retainers that fit through holes in the fascia and securely fasten into the nuts. With the attachment of the bumper fascia to the support panel by way of the sliding nuts, the fascia is free to move in the longitudinal direction relative to the support panel.

During normal operation of the vehicle with the bumper system in the outward position, the bumper fascia sliding attachment nuts are located at the outer end of their respective slots in the support panel. The bumper fascia is preferably tighly backed by a hard bumper bar which prevents any significant movement of the fascia inwardly relative to the bumper. A resilient energy absorbing media such as disclosed in the above referenced U.S. Pat. No. 3,926,462 may be used instead of a hard bar bumper if desired. In any event, upon impact, the bumper bar of the preferred embodiment strokes to absorb energy and moves inward. The bumper fascia which is sandwiched between the bumper bar and the impacting object is also forced inward. The longitudinal freedom provided by the fascia attachment to the support panel, allows the fascia to stroke along with the bumper system. After impact, the bumper bar returns to its original outward position by virtue of the recovery of the energy absorbers. On this outward movement, the bumper fascia is forced outward and returns to its original position.

With this invention, there is minimized damage during bumper impacts since the fascia is not mounted to support panels with breakaway fasteners. Furthermore, the system of attaching the bumper fascia to bumper bar as in prior systems is eliminated and twisting or large deformation of the bumper bar will generally not distort or deflect the fascia. With this invention, the sliding attachment comtrols fascia movement thereby reducing unwanted deflection and particularly fascia deflections in a generally vertical direction that would destroy or damage lamp assemblies, grill work or other components. This invention facilitates easier and tighter packaging and assembly relative to nearby components such as grills and head lamps since the large vertical fascia deflections are eliminated. Furthermore, there is reduced fascia damage during impact because large distortions of the resilient plastic fascia are eliminated.

An object of this invention is to provide a new and improved stroking fascia for covering an energy absorbing bumper assembly which moves between outer and inner positions and which is connected to supporting body work between an inner and an outer positions by sliding fascia attachments.

Another object of this invention is to provide a new and improved body work attachment for front or rear bumper fascias utilizing elongated track means and slider nuts to allow the bumper fascia to stroke in a fore/aft direction when the bumper is stroked during impacts.

These and other features, objects and advantages of this invention will be more apparent from the following detailed description and drawing in which:

FIG. 1 is a pictorial view of a portion of an automotive vehicle.

FIG. 2 is a sectional view taken along lines 2—2 of FIG. 1.

FIG. 3 is a sectional view taken along lines 3—3 of FIG. 2.

FIG. 4 is a sectional view similar to FIG. 3 of the bumper assembly and fascia of this invention positioned outwardly by an energy absorber.

FIG. 5 is a view similar to that of FIG. 4 illustrating the bumper and fascia stroked inwardly.

Turning now in greater detail to the drawing, there is shown in FIG. 1 a portion of one end of an automotive vehicle 10 having a body 12 that terminates in an end panel 14 that extends across the end of the vehicle. This end panel is made from fiberglass or other suitable material and has pockets or recesses 16 to receive a head lamp assembly 18 that includes a mounting bracket 20 secured to an end wall of the panel 14. The end panel 14 also has an outwardly projecting lower mounting ledge 22 disposed immediately below the lamp assembly 18. Disposed below the mounting ledge 22 is a hard bar bumper assembly 24 preferably of steel or other suitable material which is generally C-shaped in cross section and which also extends laterally across the end of the vehicle.

The hardbar bumper assembly is operatively mounted to the vehicle for stroking movement from the outer position shown in FIGS. 2 and 4 to an inner position shown in FIG. 5 in response to impact loads exceeding those of a predetermined magnitude (A 2.5 mph impact for example). This mounting is preferably by means of a energy absorbing units such as illustrated at 26 which may be of the telescopic type disclosed in U.S.

Pat. No. 3,700,273, issued Oct. 24, 1972, entitled ENERGY ABSORBER BUMPER SYSTEM, assigned to the assignee of this invention and hereby incorporated by reference. More particularly, such energy absorber units have an outer cylinder 28 formed with a flange 30 welded thereto which is attached to the vehicle frame rail 32 or other suitable support structure by threaded fasteners 34. Mounted for telescopic movement within the outer cylinder 28 is a coaxial inner cylinder 36, the outer end of which has a mounting flange 38 that attaches to the hard bar bumper assembly 24 by threaded fasteners 40.

This invention incorporates a stroking fascia 42 of resilient plastics material which provides a finished appearance for the vehicle and which is mounted directly to the end panel 14 in a manner so that it does not deflect or buckle on impact and damage or destroy the lamp assembly 18 or grill work or other components of the vehicle. The fascia is of a suitable reaction injected molded plastic material known as RIM of an elastomeric urethane with a selected density and degree of flexibility. The fascia can be made with fillers for performance characteristics such as increased rigidity and tensile strength as desired.

The fascia 42 has a top wall 44 which is coextensive with the mounting ledge 22 of the end panel and extends inwardly and terminates in a downwardly stepped connector flange 46 that rests on the mounting ledge. The connector flange 46 carries a plurality of slide assemblies 48 which slidably connect the fascia to the front end panel 14 of the vehicle or other vehicle body work. The slide assemblies comprise "push in" plastic nuts 50 and headed retainers 52. The nuts are generally U-shaped so that the sides can be squeezed together for easy insertion into slots or tracks in the mounting ledge as described below and as shown best in FIG. 3. The retainers are of the "Christmas Tree" type having shanks with retention barbs 53 to engage the bottom surface of opposing retention ledges extending inwardly from the sides of the nuts. The slide assemblies operate in a series of longitudinally extending channels 54 and slots 56 formed in rank across the mounting ledge. With this connection, the fascia can stroke in a longitudinal or fore/aft direction when the bumper system is displaced.

Before impact, the bumper system is in the forward position and the bumper fascia and slide assemblies 48 are at the forward ends of the slots 56 in the front end panel. The bumper fascia is tightly backed by the bumper bar which prevents any significant movement of the front of the fascia inwardly relative to the bumper assembly on minor contact therewith. Upon impacts of a predetermined magnitude, the bumper assembly strokes inwardly with the energy absorber unit absorbing impact energy. The bumper fascia which is also impacted is forced inwardly toward the phantom line position as shown in FIG. 2. The fore/aft freedom of the fascia attachment to the support panel allow the fascia to stroke along with the bumper system without deflection or buckling or excessive loading of the slide assemblies. This sliding attachment particularly limits or prevents the upward buckling of the fascia which would otherwise crowd into the lamp assembly 18 to damage or destroy this component. After impact, the bumper bar returns to its original forward position forcing the bumper fascia outward to its original position. This occurs also without stressing of the slide assembly to provide for long service life while maintaining good appearance. Additionally, in the event that the fascia is damaged or destroyed and replacement or repair is needed, this slide construction facilitates the removal of old fascia from the end panel of the vehicle and replacement by a new or repaired fascia. The head of push nut 50 has a thickness equal to the depth of channel 54 to provide continuous and level support of the connector flange 46 of the fascia without any indention of deformation thereof as shown in FIG. 3.

While a preferred embodiment of this invention has been shown and described, other modifications will be apparent to those skilled in the art. Accordingly, the scope of this invention is set forth in the following claims.

The embodiments of the invention in which an exclusive propeerty or privilege is claimed are defined as follows:

1. In an automotive vehicle having exterior body work, a bumper assembly operatively disposed at one end of said body work for stroking movement from an outer position away from said bodywork to an inner position adjacent to said body work, support structure means forming part of said vehicle, energy absorbing means operatively connecting said bumper assembly to said support structure means for movement between said inner and outer positions to absorb energy of impact loads applied to said bumper assembly, a fascia covering said bumper assembly, said body work having a plurality of laterally spaced track means formed therein, each of said track means comprising a longitudinally extending channel recessed in said body work defined by opposing side walls with a bottom wall therebetween and longitudinally extending slot means extending completely through said bottom wall, slide assembly means connecting said fascia to said track means so that said fascia strokes with said bumper assembly in response to impact loads applied thereto, said slide assembly means comprising resilient push-in nut means extending through said slot means having a first portion slidably received within said channel and retainer means extending through said fascia into engagement with said slide nut means.

2. The combination defined in claim 1 wherein said nut means further comprises a second portion of resiliently flexible material and generally U-shaped for squeeze insertion within said slot means.

* * * * *